United States Patent
Taniyama

(10) Patent No.: US 7,434,725 B2
(45) Date of Patent: Oct. 14, 2008

(54) BILL HANDLING MACHINE, AUTOMATED TELLER MACHINE, AND METHOD FOR PAYMENT OF CHANGE AT AUTOMATED TELLER MACHINE

(75) Inventor: Yukie Taniyama, Nagoya (JP)

(73) Assignee: Hitachi, Ltd., Tokyo (JP)

( * ) Notice: Subject to any disclaimer, the term of this patent is extended or adjusted under 35 U.S.C. 154(b) by 1059 days.

(21) Appl. No.: 10/452,935

(22) Filed: Jun. 3, 2003

(65) Prior Publication Data

US 2004/0015439 A1    Jan. 22, 2004

(30) Foreign Application Priority Data

Jun. 5, 2002    (JP)   ............... 2002-163702

(51) Int. Cl.
*G06Q 40/00* (2006.01)
*G07D 11/00* (2006.01)
*G07F 19/00* (2006.01)
*G06K 5/00* (2006.01)
*G06F 17/00* (2006.01)

(52) U.S. Cl. .................. 235/379; 235/375; 235/380; 902/9; 902/18

(58) Field of Classification Search ............... 235/375, 235/379, 380; 902/9, 18; 194/206, 217, 194/265.01; 271/176; 209/534
See application file for complete search history.

(56) References Cited

U.S. PATENT DOCUMENTS

| | | | | |
|---|---|---|---|---|
| 4,225,779 A * | 9/1980 | Sano et al. | ............... | 235/379 |
| 4,443,692 A * | 4/1984 | Nishimura | ............... | 235/379 |
| 4,541,057 A * | 9/1985 | Hagiwara | ............... | 705/43 |
| 4,889,240 A * | 12/1989 | Sato et al. | ............... | 209/534 |
| 5,247,159 A * | 9/1993 | Yuge et al. | ............... | 235/379 |
| 5,616,902 A * | 4/1997 | Cooley et al. | ............... | 235/380 |
| 6,006,209 A * | 12/1999 | Takeuchi et al. | ............... | 705/40 |
| 6,422,458 B1 * | 7/2002 | Katou et al. | ............... | 235/379 |
| 6,971,573 B2 * | 12/2005 | Fujioka | ............... | 235/379 |
| 7,000,778 B2 * | 2/2006 | Omori et al. | ............... | 209/534 |
| 2002/0003163 A1 * | 1/2002 | Peebles et al. | ............... | 235/379 |
| 2002/0014736 A1 * | 2/2002 | Katou et al. | ............... | 271/126 |
| 2002/0088850 A1 * | 7/2002 | Katou et al. | ............... | 235/379 |
| 2003/0127509 A1 * | 7/2003 | Nomiyama et al. | ............... | 235/379 |
| 2004/0015439 A1 * | 1/2004 | Taniyama | ............... | 705/40 |
| 2006/0181000 A1 * | 8/2006 | Nishida et al. | ............... | 271/176 |

(Continued)

FOREIGN PATENT DOCUMENTS

JP      63-187386      8/1988

(Continued)

*Primary Examiner*—Daniel Walsh
(74) *Attorney, Agent, or Firm*—McDermott Will & Emery LLP

(57) ABSTRACT

An automated teller machine having a customer operation part, a deposit/payment port to put into bills, a distinction part which distinguishes bill, storages which stores bill, a storage box which keeps bill decided to be true bill at the distinction part among bills put into the deposit/payment port, and a main control part which pays out bills from the storages with true bills kept in the storage box, stores rejected bills in the storage box when the amount of money put into the deposit/payment port is greater than the amount input at the customer operation part. The machine idle-rotates a drum type temporary storage box without winding bill when the amount of true bill is greater than the payment amount input at the customer operation part.

20 Claims, 8 Drawing Sheets

U.S. PATENT DOCUMENTS

2007/0278286 A1 * 12/2007 Crowell et al. .............. 235/379

FOREIGN PATENT DOCUMENTS

| JP | 02311989 A | * | 12/1990 |
| JP | 10302119 A | * | 11/1998 |
| JP | 2000-172946 | | 6/2000 |
| JP | 2001-118111 | | 4/2001 |

* cited by examiner

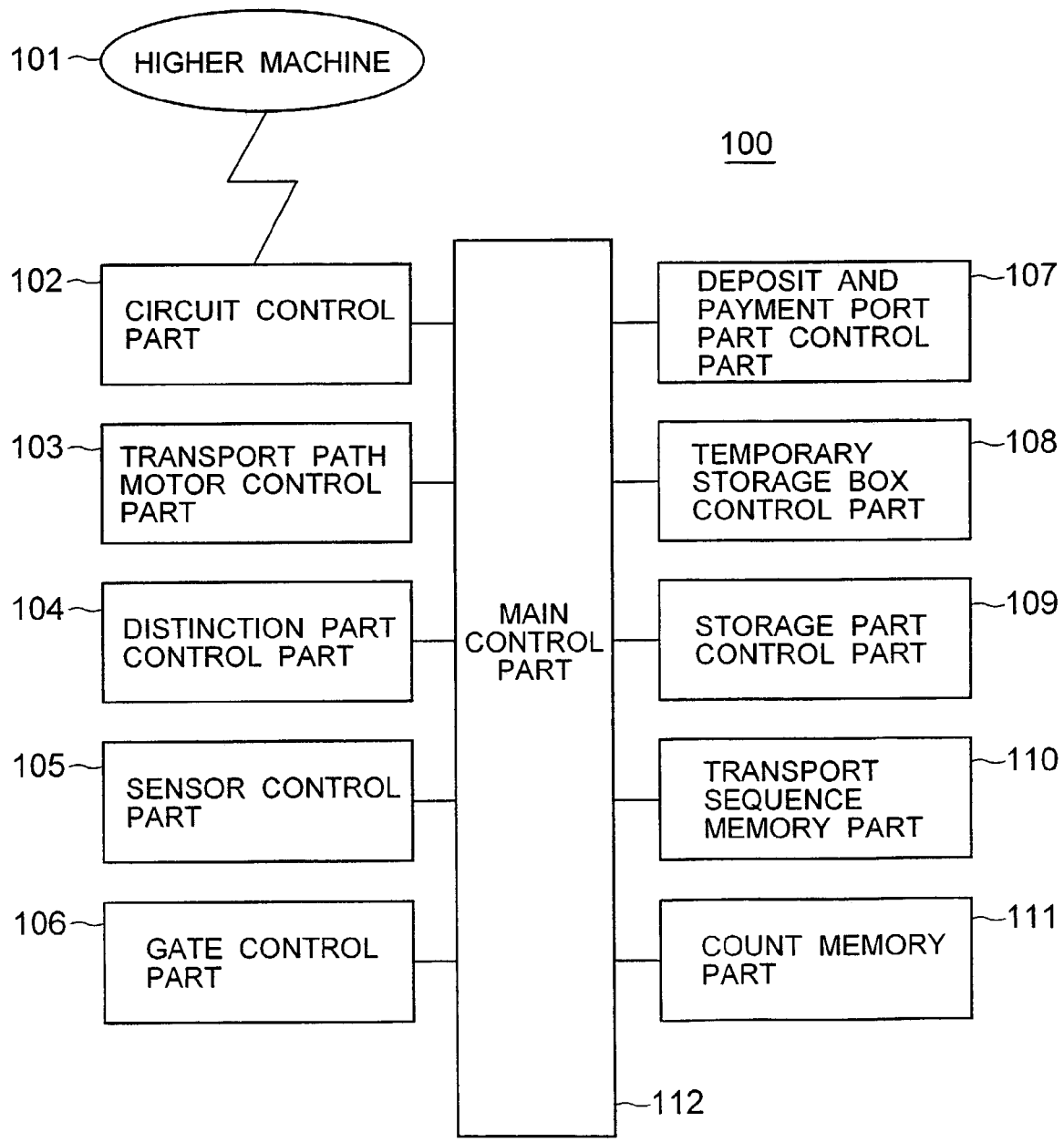

BILL HANDLING MACHINE, AUTOMATED TELLER MACHINE, AND METHOD FOR PAYMENT OF CHANGE AT AUTOMATED TELLER MACHINE

BACKGROUND OF THE INVENTION

The present invention relates to the automated teller machine (ATM) which is used at financial institutions etc. and the bill handling machine built in the automated teller machine.

At the automated teller machine a user can deposit the amount of money which the user put into the machine. However, if the user has to deposit all the money the user puts into the machine, it would be inconvenient for the user for example when the user has only a ten-thousand yen bill and wants to deposit only one thousand yen. Therefore, there is a technique which counts the bills that the user put into and store them temporarily in a stacker, then after storing the bills in each bill storage pays the amount resulted from subtracting the amount that the user wants to deposit from the amount that are put into and counted. The amount resulted from subtracting the amount that the user wants to deposit from the amount that are put into and counted is called so-called change and the operation to pay the change is called payment of change.

However, there is a problem that it takes time to execute payment of change after storing the bills in the bill storage. Then for example JP-A-63-187386 provides a medium process method for payment of change with bills reserved temporarily in a stacker, and JP-A-63-187386 has a storage (so-called payment reject storage) to store the bills which are decided to be damaged bills (so-called payment reject bill) when they are taken out from a bill storage and pass a distinction (discriminating) part, in order to execute payment of change in a short time.

Further, JP-A-2000-172946 describes a bill deposit and payment machine (bill handling machine) that enables a simple bill transport path design. And it improves operability and security by putting the bill storages together at the lower part.

SUMMARY OF THE INVENTION

There are problems such as that it needs more space and bigger machine if the payment reject storage is arranged after the bills have passed the distinction part from the bill storage as described in the technique of JP-A-63-187386.

On the other hand, the transport path design of bill handling machine of JP-2000-172946 has the advantages of saving space, simplicity of transport path design, and improvement of maintenance and security and so on by not arranging the payment reject storage after the bills have passed the distinction part from the bill storage, and by storing also the payment reject bill in the lower part storage.

However, in order to accomplish the payment of change with this structure, it is needed to store the bills deposited and counted at the distinction part in a temporary storage box to pay out once the bills reserved in the temporary storage box and store them in the bill storage, and after that to pay out the bills of amount of change from the bill storage and pay them, therefore there is a problem that it is time-consuming.

Therefore, it is the object of the present invention to provide techniques for payment in a short time before storing the counted bills in the bill storage without the need to arrange the payment reject storage in the position after the bills have passed the distinction (discriminating) part from the bill storage.

In order to accomplish the above object, according to one aspect of the present invention, there is provided an automated teller machine comprising a customer operation part, a deposit and payment opening or port where bills are put into, a distinction (discriminating) part which discriminates or distinguishes the bills, storages which store the bills, a depository (storage box) which keeps the bills that are distinguished to be true bills at the distinction part among the bills that were put into the deposit and payment opening or port, a main control part which pays out the bills from the storage with the true bills kept in the depository and among the paid out bills keep the bills rejected at the distinction part in the storage when the amount of the bills put into the deposit and payment opening is bigger than the amount of money put into at the customer operation part. Thereby it can provide the payment of change highly convenient for the user in a relatively short time utilizing the advantages such as that there is no need to arrange the payment reject storage in the position after the bills have passed the distinction part from the bill storage, that because bill storage boxes are concentrated in the lower part it can reasonably improve security by covering the shell of the lower part particularly thick, that by utilizing the two-way transport path it can have a simple transport path design and it become easy to maintain, and that for example by not having the reject storage at the upper part it can save space.

Also for example, when the amount of the bills which are decided to be true bills at the distinction part is bigger than the amount of payment put into at the customer operation part, by idle-rotating the temporary storage box of drum type without winding bills a space can be put between the input true bills and the payment reject bills and it is effective to prevent mixture of the bills.

Other objects, features and advantages of the invention will become apparent from the following description of the embodiments of the invention taken in conjunction with the accompanying drawings.

BRIEF DESCRIPTION OF THE DRAWINGS

FIG. 2 is a functional block diagram of a bill handling machine.

DESCRIPTION OF THE EMBODIMENTS

An example of the preferred embodiment of the present invention will be explained below.

Figure 1:
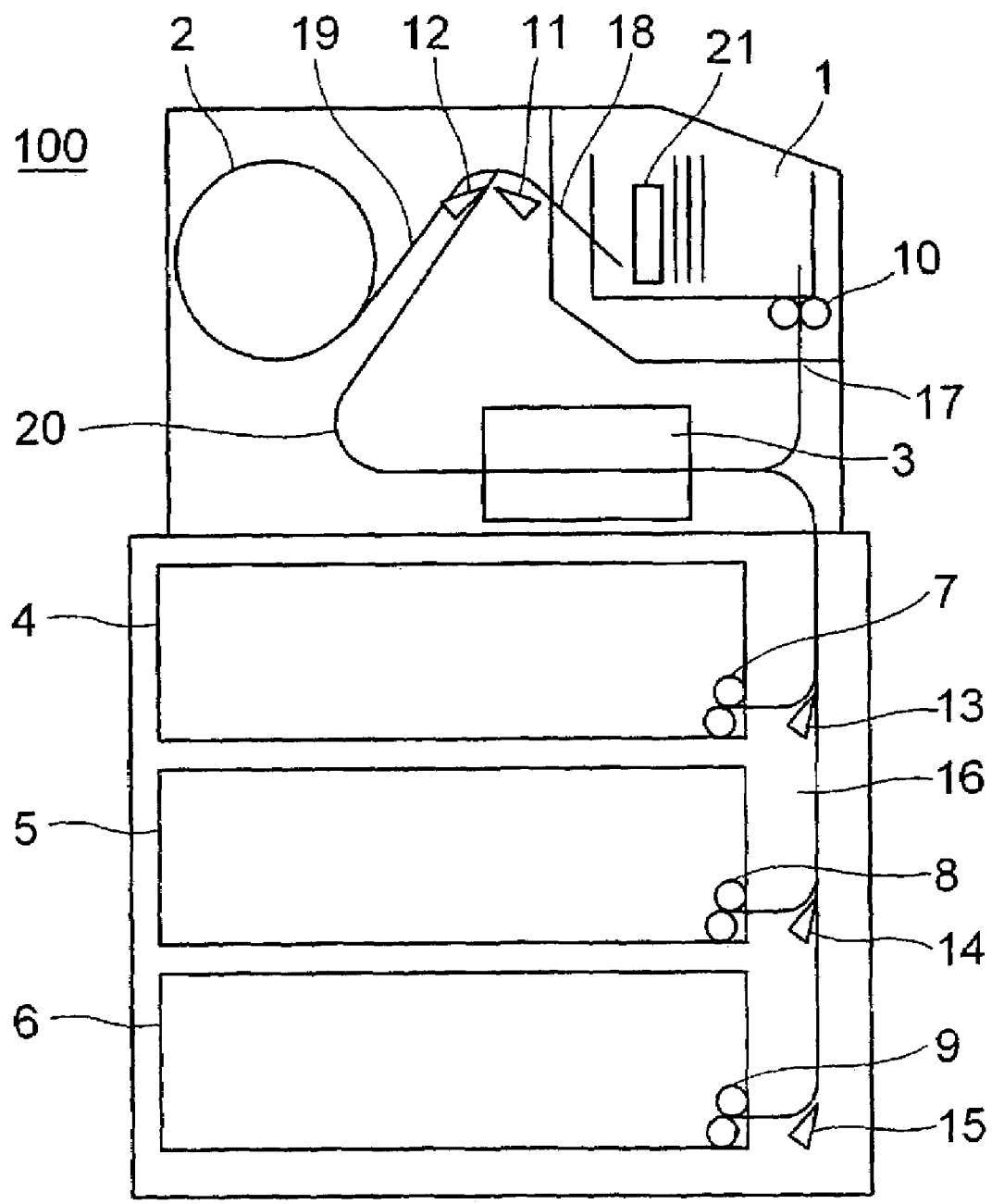
FIG. 1 is a structure diagram of a bill handling machine.

FIG. 1 is a schematic diagram of a bill handling machine 100. 1 denotes a deposit and payment port control part, 2 a temporary storage box (temporary reserved accepting unit) of drum type which puts the bills on a belt and winds and keep the bills temporarily, 3 a distinction (discriminating) part which discriminates or distinguishes true or false, right (intact) or damaged, kind of money and state of the transport of the bills, 4 a reject storage to store the reject bills, 5 and 6 storages to store the bills, 7-10 separation parts to separate the bills, 11-15 gates to switch the transport direction of the bills, 16-20 transport paths to transport the bills, 21 a partition board to separate the bills set from the exterior and the bills carried from the bill handling machine 100.

FIG. 2 is a control block diagram of bill handling machine 100. 101 denotes a higher (host) machine such as an automated teller machine which directs deposit and payment of money to the bill handling machine 100, 102 a circuit control part to connect the higher machine 101 and the bill handling machine 100 by communication line. The higher machine 101 has a customer operation part which is not shown and displays a guidance to the customer and receives input from the customer. 103 denotes a transport path motor control part which drives transport path 008 or transport paths 16-20, 104 a distinction (discriminating) part control part which distinguishes true or false, right or damaged, kind of money and state of transport of the bills, 105 a sensor control part which controls sensors such as passage sensor to detect passage of the bills and sensors within the storages to detect residual bills, 106 a gate control part which controls gate 007 or gates 11-15 to switch the transport destination based on the information from the distinction part control part 104 or the sensor control part 105. 107 denotes a deposit and payment port part control part which controls the deposit and payment port part, 108 a temporary storage box part control part which controls temporary storage box, 109 a storage part control part which controls reject storage 004, or reject storage 4 and bill storage 005, or bill storages 5, 6. 110 denotes a transport sequence memory part which stores the transport sequence of the bills, 112 a count memory part which stores transport count (the number of the transported bills) or storage count of the bills, 112 a main control part which controls each part of the bill handling machine 100.

Figure 8:
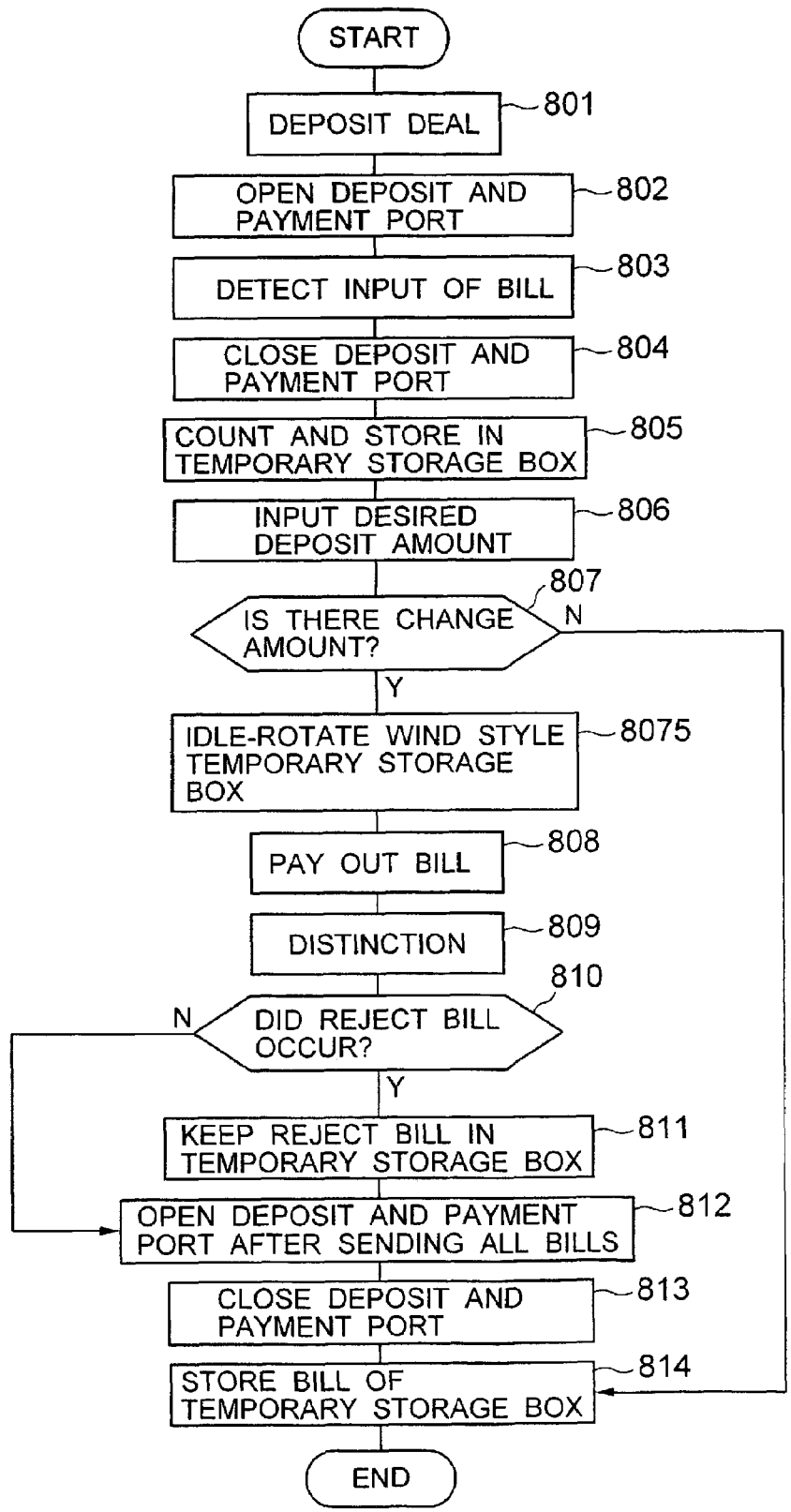
FIG. 8 is a flow chart of payment of change.

FIG. 8 is a schematic flow of the control of the main control part 112 at the deposit operation executed by the bill handling machine 100 shown in FIG. 1 and FIG. 2. The present invention provides the payment of change highly convenient for the user in a relatively short time utilizing the advantages of the bill handling machine 100 (such as that the bill storage boxes are concentrated in the lower part, accordingly the reject storage 4, storages 5, 6 are concentrated in the lower part of the bill handling machine 100 so it is possible to improve security reasonably by covering particularly thick the shell of the lower part of the bill handling machine, that by using two-way transport path the machine can have a simple design of transport path and become easy to maintain, that by not having a reject storage in the upper part it can save space). For this purpose, the present invention stores the payment reject bills (which are the bills that are paid out from the storages 4, 5 and rejected at the distinction part 3) with deposit true bills in the temporary storage box 2 which stores the deposit true bills. The process of the main control part 112 will be described below referring to FIG. 8.

When a customer selects the deposit deal at the higher machine 101 (step 801), the shutter of the deposit and payment port 1 is opened by the deposit and payment opening part control part 107 (step 802).

When it is detected that the bills are put into at the deposit and payment opening 1 (step 803), the shutter of the deposit and payment opening 1 is closed (step 804), the transport path motor control part 103 operates the transport path 17-20 to send the bills to the distinction part 3 to distinguish and count the bills, and to store the true bills in the temporary storage box 2 (step 805). The detailed description will be given later referring to FIG. 4.

The count result by the distinction part 3 is displayed at the customer operation part of the higher machine 101 and acknowledgement of the count result by the customer is received. And desired deposit amount is received to enable deposit of only the amount the customer wants to, and to enhance the convenience of the customer (step 806).

If the input and acknowledged count result coincides with the desired deposit amount the deal or transaction is closed, and the temporary storage box control part 108 pays out the true bills stored in the temporary storage box 2 (step 808), and the bills are stored in the reject storage 4 or storages 5, 6 based on information in the transport sequence memory part 110 which stores the information and sequence of the bills to be stored in the temporary storage box 2 (step 814). Further, here, the distinction part 3 may distinguish the bills again, and based on this distinction result the bills may be stored in the reject storage 4 or storages 5, 6 respectively, and in this case improved precision of distinction will be expected. When the input and acknowledged count result is smaller than the desired deposit amount, the error message will be displayed at the customer operation part.

Then, if the desired amount is smaller than the input and acknowledged count result, it is decided that there is change (step 807). Further, the decision whether there is change or not may be performed either at the higher machine 101 or the main control part 112.

It takes time to pay out again the amount of change from the storages 5, 6 after storing the true bills kept in the temporary storage box 2 in the storages 5, 6. Therefore in the present invention the payment of change is performed with the input true bills kept in the temporary storage box 2.

Then, if the payment reject bills are occurred at the payment of change, then the payment reject bills will be kept in the temporary storage box 2, but there have already been kept the true bills in the temporary storage box 2, and in order to avoid the mixture of the true bills and the payment reject bills, to prevent the adhesion or so on of the input bills and the payment reject bills, and to recognize the switch from deposit to payment, the temporary storage box control part 108 directs the temporary storage box 2 to idle-rotate without winding bills to a certain degree (for example 300 mm) (step 8075). Namely, the temporary storage box 2 waits next bill with a certain interval or distance on the belt from the bills kept in the temporary storage box 2 of drum type, the interval (hereafter also will be called interval A) which is broader than the interval between each true bill.

The interval A works effectively on paying out the bills from the temporary storage box other than the effect to prevent the adhesion or so on. Namely, it also has the effect to prevent the mixture of the payment reject bill and the true bill by the narrowing of the interval between the payment reject bill and the true bill by the separation of the bill (split of one payment reject bill into two, separation of the payment reject bills that were detected as 2 sheets error).

Moreover, in case the machine changes the process of paying out depending on payment reject bill or true bill (when paying out payment reject bill it is not distinguished at the distinction part 3, but when paying out true bill it is distinguished at the distinction part 3), it is expected to have an effect to reserve time to switch the process by putting a certain interval between the payment reject bill and the true bill that is broader than the interval between each true bill.

The storage part control part 109 receives a direction to pay out the bills from the storages 5, 6 (step 808), then the bills paid out from the storages 5, 6 are sent to the distinction part 3 and distinguished (step 809).

When the bills paid out for payment are distinguished to be true bills and are in good condition as not inconvenient to be passed to the customer, the bills are transported to the deposit and payment opening 1 (No at step 810).

However, even the bills that were stored in the storages 5, 6 may erroneously include bills that are not true bills or may get dirty or torn during the carriage for some reason or other. In this case, those bills are treated as payment reject bills which are rejected at the distinction part 3 (Yes at step 810).

Here, conventionally, there was need to prepare a box to store the payment reject bills, but according to the present invention technique, in order to make the box unnecessary and to realize the space saving of the bill handling machine 100, if payment reject bills occur, it keeps them in the temporary storage box 2 (step 811). The detailed description will be given later referring to FIG. 5.

The bills are paid out successively from the storages 5, 6, and the bills which are decided to be true bills and appropriate to payment to the customer at the distinction part 3 are transported to the deposit and payment port 1 in the amount of the change decided at step 807, then the shutter of the deposit and payment port 1 opens (step 812). If the machine detects that the bills are taken out, the shutter of the deposit and payment port closes (step 813).

When the shutter of the deposit and payment port 1 is closed, at this timing the machine stores the bills kept in the temporary storage box 2 in the reject storage 4 or storages 5,6 respectively (step 814) and close the deal. The detailed description will be given later referring to FIG. 6, noting that, in storing the bills, the information in the transport sequence memory part 110 is referred.

FIGS. 3A-3G are an example of stack bill information 310 stored in the transport sequence memory part 110 which shows the bill information about the bills kept in the temporary storage box 2. The stack bill information 310 includes a memory area 311 which stores the bill information per one bill, a store pointer 313 which points the area to store the information, and a process pointer 312 which points the memory area 311 to process the information, and can store kind of money, distinction result and length of the bill which is to be stored in the temporary storage box. The detailed description will be given later referring to FIG. 4, FIG. 5 and FIG. 6. Here, by using both the store pointer and the process pointer, the machine can grasp the next data to process (where the process pointer points) and the last data to be processed (one before the store pointer).

Figure 4:
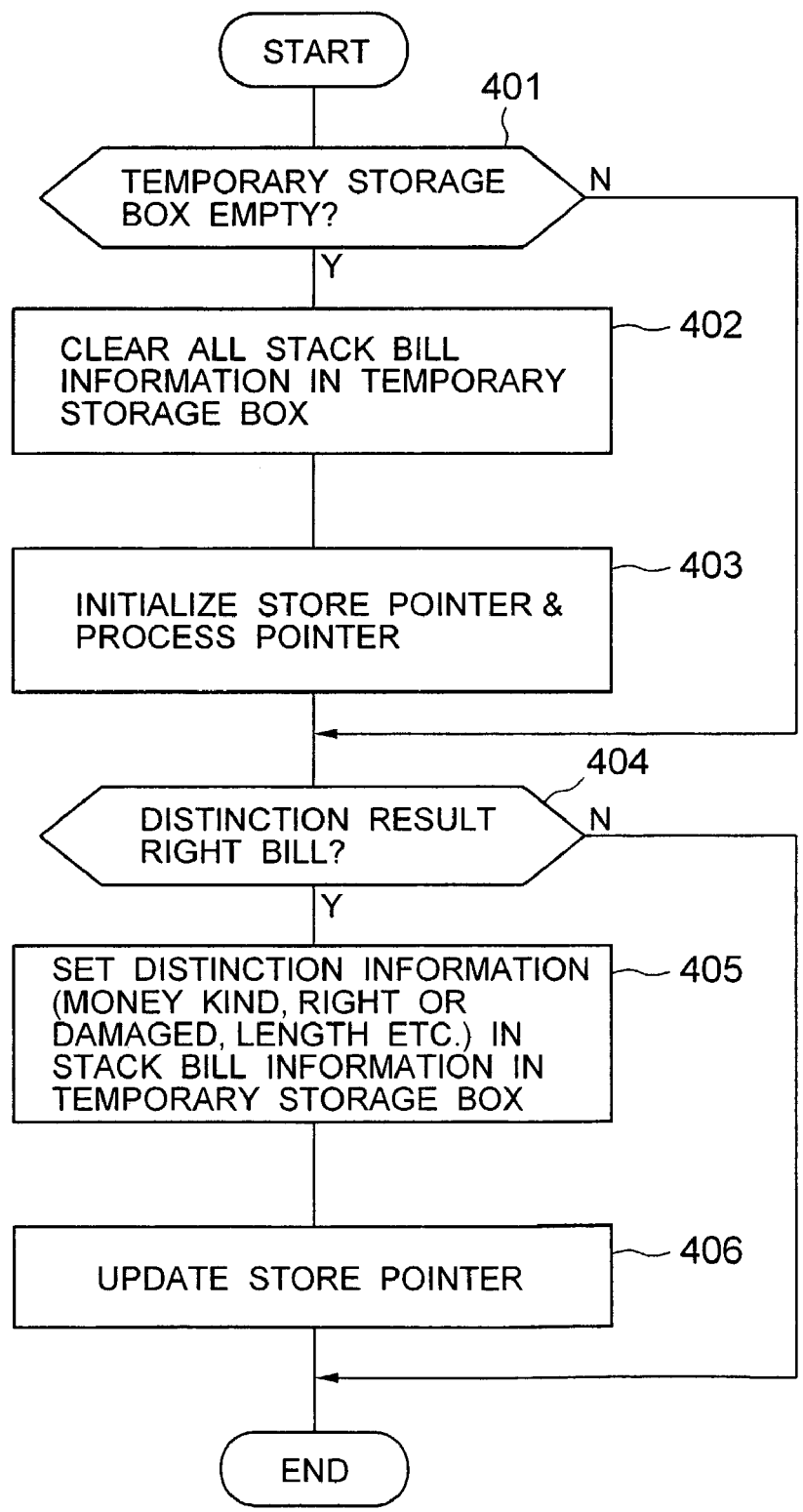
FIG. 4 is a flow chart of temporary storage box of deposit bills.
Figure 5:
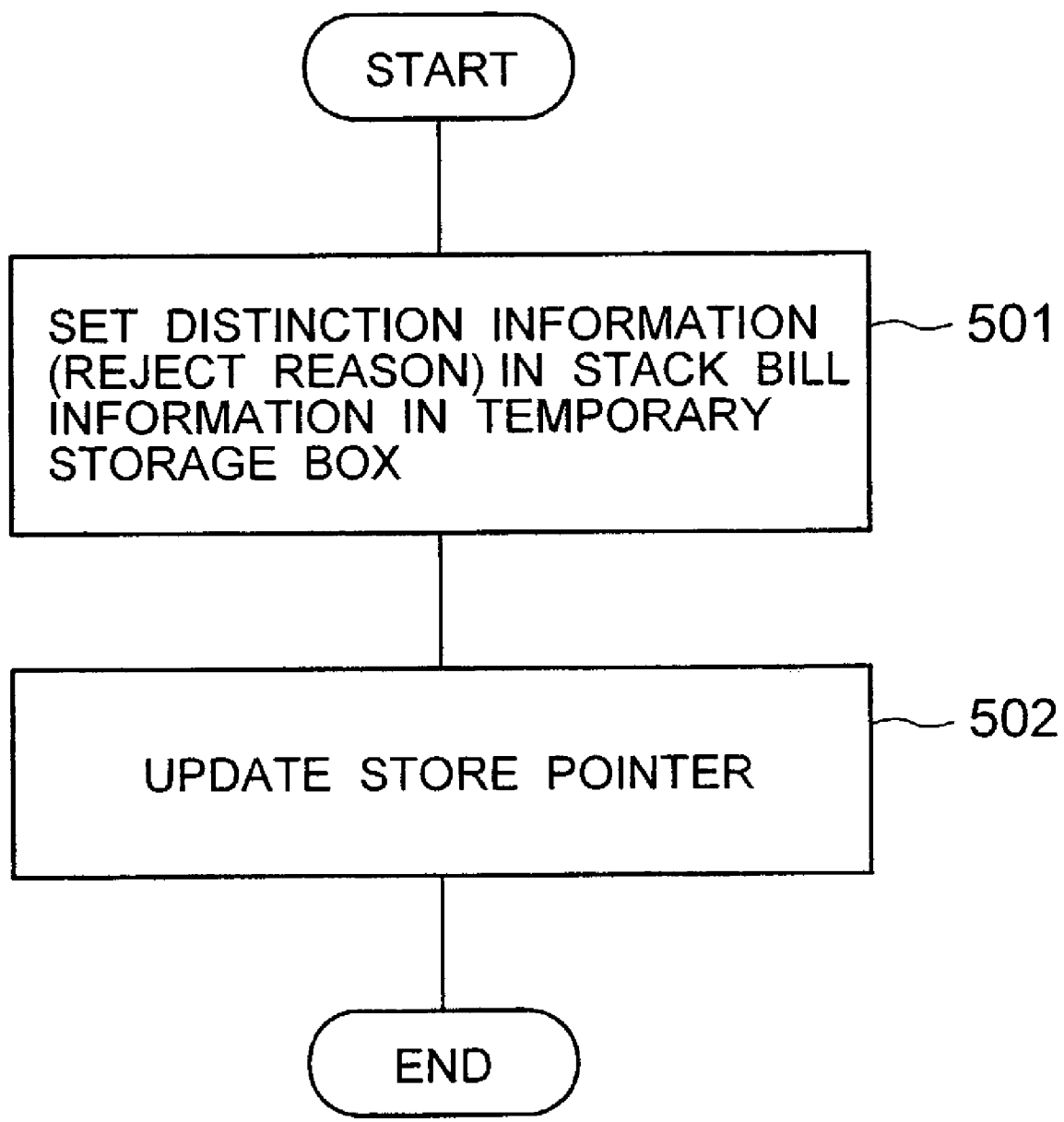
FIG. 5 is a flow chart of temporary storage of payment reject bills.
Figure 6:
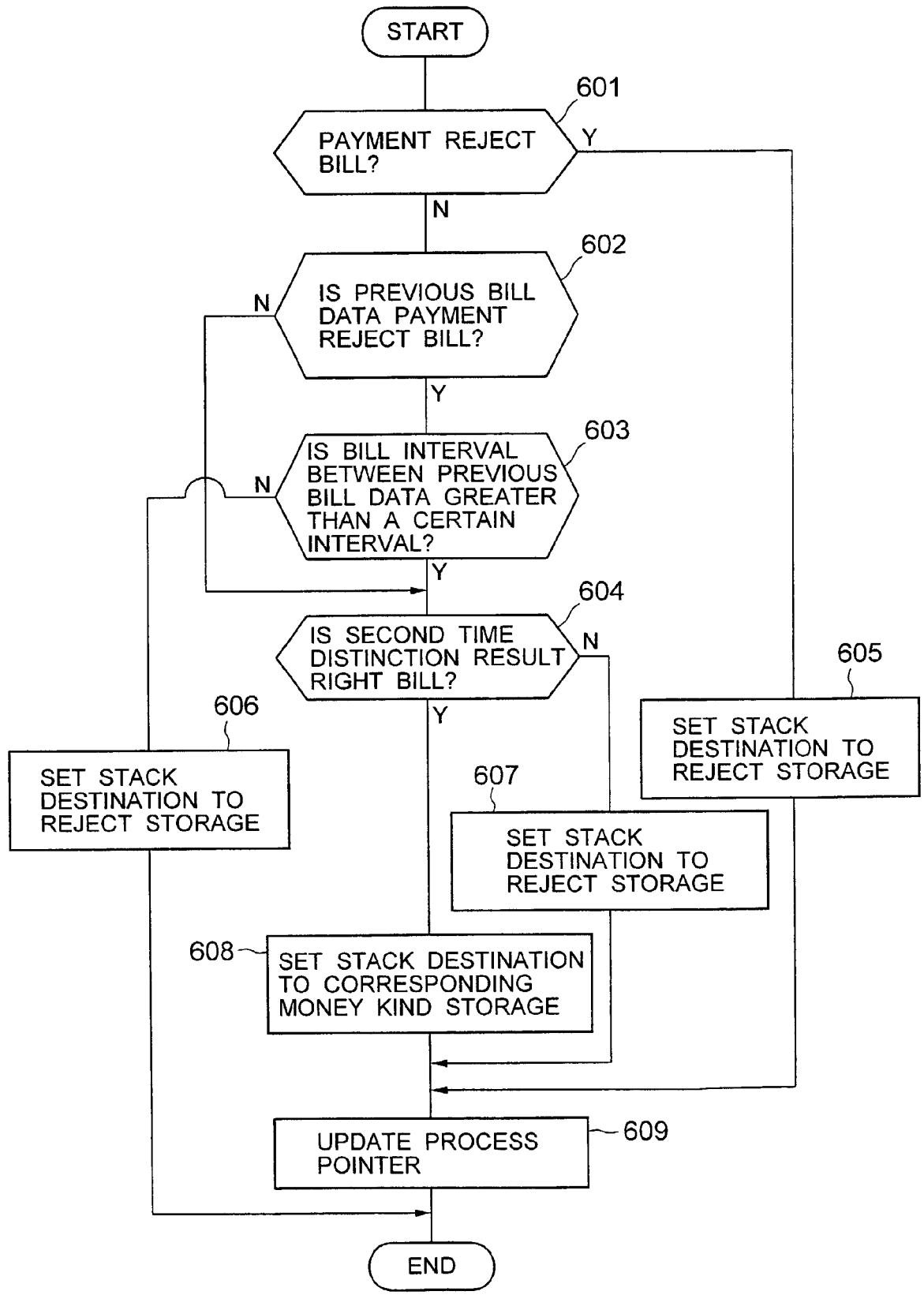
FIG. 6 shows the storage of temporarily stored bills.

FIG. 4, FIG. 5 and FIG. 6 are flow charts describing the details of the steps 805, 811 and 814 respectively.

Hereafter, using the flow charts of FIG. 4, FIG. 5 and FIG. 6 the general situation of the operation of the bill handling machine by the control of the main control part 112, particularly the general operation of the payment of change using the wind style drum type temporary storage box will be explained along with the description of 301-307 of FIGS. 3A-3G.

For example, assume that thirty thousand yen (three ten-thousand yen bills) are set at the deposit and payment opening 1, and the user input to deposit twenty-two thousand yen. Here, assume that the storage 5 is a ten-thousand yen bill reflux storage and the storage 6 is a thousand yen bill reflux storage.

The ten-thousand yen bills put into the deposit and payment port 1 by the user are taken into the bill handling machine 100 according to the deposit and count direction from the higher machine 101.

First, the deposit of the bills put into the deposit and payment opening 1 (step 805) will be explained below referring to FIG. 4.

The main control part 112 closes the open-close part of the deposit and payment port 1 after receiving a deposit and count direction via the circuit control part 102. The main control part 112 directs the transport path motor control part 103 to drive the transport paths 17-20 from the deposit and payment port 1 in the direction to the temporary storage box 2, and the sensor not shown checks the existence of the bill to determine if the temporary storage box 2 is empty or not (step 401). If it is empty, the main control part 112 clears the memory area 311 of the stack bill information 310 (step 402), and initialize the stack bill information 310 with the store pointer 313 and process pointer 312 for the control of stack bill information 310 at the head as 301 of FIG. 3A (step 403). If there are bills in the temporary storage box 2 then it does not clear and goes forward to step 404.

The deposit and payment port part control part 107 separates the bills at the deposit and payment opening 1, and drives the transport path to transport the bill. The bill separated from the separation part 10 is distinguished at the distinction part 3 of its money kind, true or false etc. and if the distinction result is right bill (step 404) it is wound in the temporary storage box 2 by the temporary storage box control part 108. If the distinction result is not right bill, the bill is sent to the opposite side of the partition board 21 of the deposit and payment port to the space where the user put into the bills (in FIG. 1 the left side of the partition board 21 in the deposit and payment opening 1) by the transport path 18.

Figure 3A:
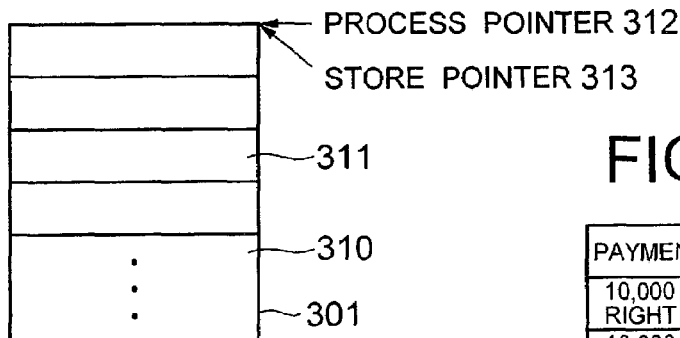
FIGS. 3A-3G are an example of transport sequence memory part.
Figure 3B:
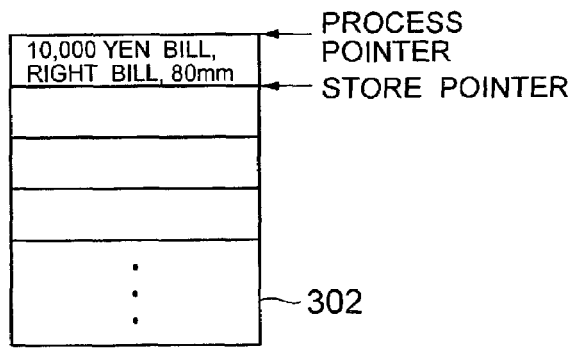

As the bill being wound to the temporary storage box 2, the distinction information (money kind, right or damaged, length, etc.) is stored in the memory area 311 of the stack bill information 310 by the transport sequence memory part 110 (step 405), next, in order to store the information on the bill wound to the temporary storage box 2, the store pointer 313 is set to the memory area 311 where the bill information is stored as 302 of FIG. 3B (step 406). And, the count memory part 111 is updated by adding one to the bill count temporarily kept in the temporary storage box 2. Hereafter, the count memory part 111 is updated as the count to be stored in the temporary storage box changes. This process continues until all the bills put into the deposit and payment port 1 are separated and the bills which are distinguished to be right bills at the distinction part 3 are all reserved in the temporary storage box (repetition of step 404—step 406).

Further, storing the money kind and the distinction result of the bills to be stored in the temporary storage box 2 is to distinguish them later from the payment reject bills which are stored in the temporary storage box 2 together, particularly when the temporary storage box 2 is a wind style drum type there is not much possibility that the order would be changed, so it is effective because when paying out the bills from the temporary storage box 2 it is possible to store the bills in the reject storage 4, storage 5 or 6 without distinguish them at the distinction part 3 and only based on the memory in the transport sequence memory part 110.

Moreover, the process stores the length of the bills to detect that the bills are transported overlapped as the bills are being paid out from the temporary storage box 2. If the bills are transported overlapped, the overlap can be detected because they are longer than the bill length stored in the transport sequence memory part 110.

Figure 3C:
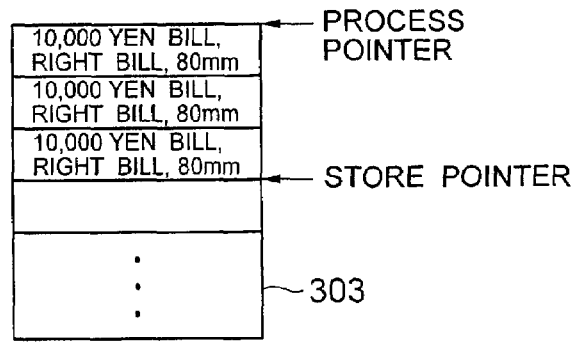
Figure 3D:
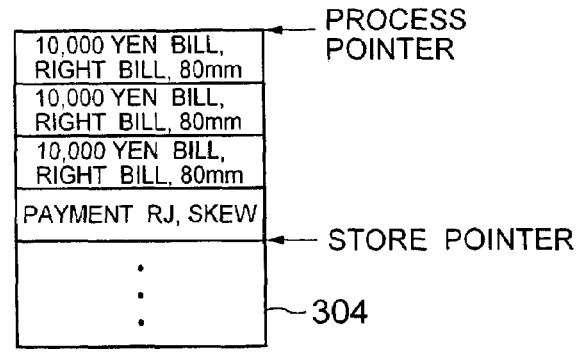
Figure 3E:
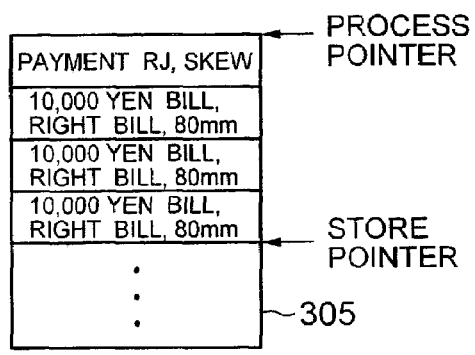
Figure 3F:
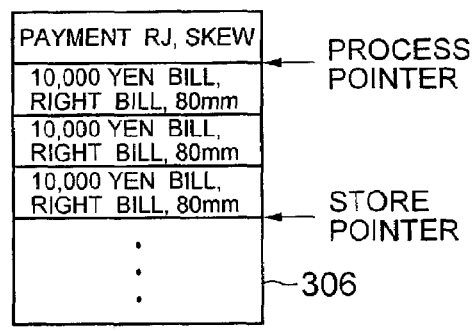

Step 805, that is when the flow chart of FIG. 4 is completed, three one-thousand yen bills are put into the deposit and payment port 1, when all of them are distinguished to be right bill, three memory areas 311 in which the ten-thousand yen bills are stored line up in order as 303 of FIG. 3C, the completion of thirty thousand yen's deposit and count is reported to the higher machine 101 via the circuit control part 102.

At the higher machine 101, it displays that thirty thousand yen has been counted to the customer at the customer operation part not shown, and let the customer put in the amount that the customer wants to deposit. Here, if the customer puts in twenty-two, thousand yen, the process subtracts the desired deposit amount put into by the customer (twenty-two thousand yen) from the amount input and counted (thirty thousand yen), and as there is a surplus amount (eight thousand yen), the process determines the surplus amount as the amount of change.

The higher machine which received the report that the deposit and count has been completed, to pay eight thousand yen as change directs the payment of change via the circuit control part 102, and the main control part 112 which received the direction of payment of change via the circuit control part 102 directs the transport path motor control part 103 to drive the transport paths 16-20 from the storages 5, 6 in the direction to the temporary storage box 2. After the temporary storage box rotates to a certain degree, thousand bills are paid out from the storage 6 one by one in order by the storage part control part 109.

Next, with reference to FIG. 5 it will be explained below about the operation of storing the payment reject bill in the temporary storage box 2 at the payment of change (step 811).

The bills separated by the separation part 9 are distinguished by the bill distinction such as state of transport by the distinction part 3, and if the distinction result is transport error by skew, gates 11, 12 are set off by the gate control part 106, and the bills are wound into the temporary storage box 2 by the temporary storage box control part 109. Likewise, other than the skew if the distinction result is not normal such as damaged bill, not the kind of money (amount) to pay, paying out excessively, the interval between the bills are abnormal, thickness detection error, the control part directs the temporary storage box 2 to wind the bills.

When the temporary storage box 2 winds the payment reject bills, the payment reject bill, the cause of reject etc. are set to the stack bill information 310 by the transport sequence memory part 110 (step 501). It can store in order the kind of bill that are wound in order into the wind style drum type temporary storage box, the result of the distinction, and the length of the bill etc. as step 405, step 406 by updating the store pointer 313 to point the memory area 311 where the payment reject bill is stored as 304 of FIG. 3D (step 502).

When the result of the distinction of the bill which was separated from the separation part 9 is right bill, the process directs the gate control part to set gate 11 on and gate 12 off, and the bill passes the transport path 20, 18, and get stacked at the back side of the partition board 21 of the deposit and payment port 1 (in FIG. 1 at the left side of the partition board 21 in the deposit and payment port 1).

When the designated count is paid at the deposit and payment opening or port 1, the main control part 112 directs the transport path motor control part 103 to stop the transport paths 16-20. At this stage, the process opens the open and close part of the deposit and payment port 1 and let the customer take out the change, so it can pay the change to the customer prior to storing the true bills that were put into in the storage 5, 6, and shorten the waiting time of the customer.

Next, in order to store the deposit bills and payment reject bills wound in the temporary storage box 2 in the corresponding storages 5, 6 and reject storage 4, the main control part 112 directs the transport path motor control part 103 to drive the transport paths 16-20 from the temporary storage box 2 in the direction to the storages 5, 6. The stack bill information 310 of 304 of FIG. 3D formed at the winding is changed in order of rewind as 305 of FIG. 3E with the process pointer 312 and the store pointer 313 fixed. Changing the order is to make clear which process is being executed now and as both the information on winding and the information on rewind can be retained, it makes easy to check the situation later.

After the transport paths are driven, the process directs the temporary storage box control part 108 to rewind bills from the temporary storage box 2 and also directs the gate control unit 106 to set off the gates 11, 12.

Finally, referring to FIG. 6, explanation will be made below of the storage of the bills kept in the temporary storage box 2 (step 814).

The machine transports the bills of the amount of payment to the deposit and payment port 1, and closes the shutter when the bills are taken out by the customer, pays out the bills kept in the temporary storage box 2 onto the transport path and sends them to the distinction part 3. At detecting the bills at the distinction part 3, if the bill information pointed by the process pointer 312 of the stack bill information 310 is the payment reject bill (step 601), the bills may be sent to the reject storage unconditionally without distinguishing the bills at the distinction part 3 (step 605). Because even if the payment reject bills are distinguished and decided to be true bills, there is no criterion as to which is to rely on the first distinction result (at the payment of change) or the second distinction result (at the storage). And the bills are sent to the reject storage 4 because at least the bills can be rejected, therefore the second result is useless. Every time the process pays out a bill from the temporary stacker, it takes out the bill information pointed by the process pointer 312, and updates the process pointer 312 to the next bill information area (step 609). It directs the gate control part 106 to set the gate 13 on, stores the payment reject bills in the reject storage 4.

When the bill is sent to the distinction part 3 and the bill information of the stack bill information 310 pointed by the process pointer 312 is not the payment reject bill (N at step 601), it is decided whether the previous bill data is payment reject bill or not (step 602).

If the previous bill data is payment reject bill, the process decides if there is a certain interval, the interval A or a interval slightly narrower than the interval A, which is placed to recognize the change of the payment reject bill and the deposit bill, between the present bill and the previous bill (step 603). This interval is measured by a sensor in the distinction part 3, but it may be measured from the timing of the bills passing a sensor provided at the temporary storage box or the transport path.

If there is no certain interval, the process may set the stack destination unconditionally to the reject storage without distinguishing the bill at the distinction part 3 (step 606), and there is no need to update the process pointer 312 of the stack bill information 310. Particularly, when the temporary storage box is of the drum type, there is a case that there is broader interval as the bill gets jammed and delayed as it is paid out from the temporary storage box, but there is no possibility that there would be interval narrower than the certain interval. Therefore if there is no certain interval, it is more likely that some dirt may have come in between the payment reject bill and the true bill. Dirt can be dust or a fragment of bill.

Further, if there is a certain interval, the bill is distinguished again of kind of money, true or false, right or damaged, transport state etc. at the distinction part 3. Here, it may store the bill only based on the memory in the transport sequence memory part 110 without distinguishing it, but as for the bills to be stored in the storages 5, 6, the process performs the second distinction because it can improve precision of the distinction by repeating the distinction, and there are bills which were received from the customer but they are appropriate to be stored in the reject storage 4 rather than in the storages 5, 6 as the possible bill for the following deal because they are damaged bills with dirt or tear (store reject bill).

If the distinction result is right bill (step 604) the process sets the stack destination to the corresponding money kind storage (step 608), updates the process pointer 312 (step 609).

The process directs the gate control part 106 to set the gate of the corresponding money kind storage on, stores the bill in the corresponding money kind storage 5 or 6.

If the distinction result is not right bill (step 604), the process sets the stack destination to the reject storage (step 607), updates the process pointer 312 (step 609).

It sets the gate 13 on by the gate control part 106, stores the bill in the reject storage 4.

Figure 3G:
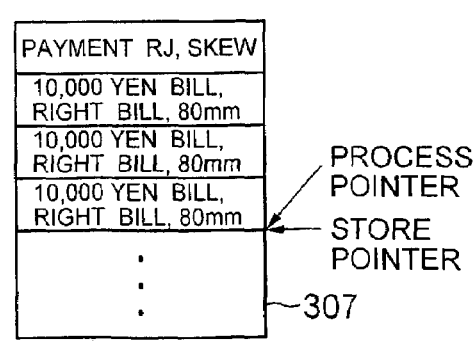

The machine performs this process to the point where the store pointer 313 points updating the process pointer 312, and the process is completed when the process pointer 312 and the store pointer 313 point the same area as 307 of FIG. 3G.

Further, referring to FIG. 4-FIG. 6, it have been explained the use of the process pointer, placing a certain interval between the true bill and the payment reject bill, and changing the order prior to storing the bills in the temporary storage box, but the present invention is not restricted to the usage of them.

For example FIGS. 7A-7G show another example where only one kind of pointer is used at the stack bill information 710 stored in the transport sequence memory unit 110, which shows bill information of the bill kept in the temporary storage box 2. At 701 of FIG. 7A, all the information stored is cleared and initialized and the indicator point 713 points the first memory area 711. At 702 of FIG. 7B and 703 of FIG. 7C, ten-thousand yen bills are stored in order, and the indicator point 713 has been updated to point the next memory area 711. At 704 of FIG. 7D, the payment reject bill and its reason are stored and the indicator point 713 has been updated.

Further, there is a switching flag 720 between the deposit bills and the payment reject bill. By this flag, for example, without measuring the transport distance between the ten-thousand yen bill and the payment reject bill to decide, only by referring the transport sequence memory part the process can recognize the switching of the deposit bill and the payment reject bill.

Figure 7A:
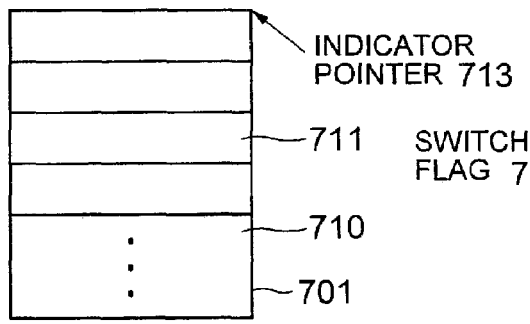
FIGS. 7A-7F show another example of transport sequence memory part.
Figure 7D:
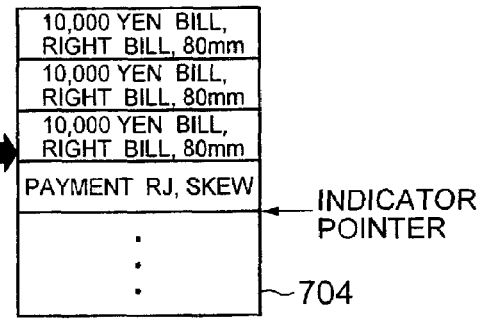
Figure 7B:
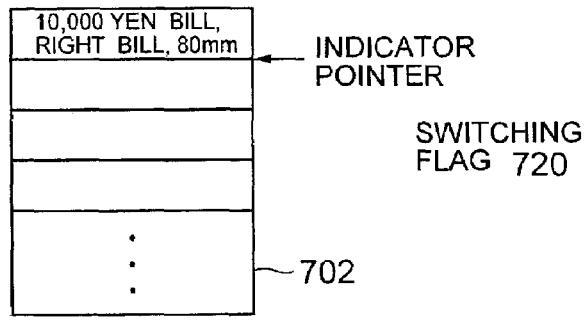
Figure 7E:
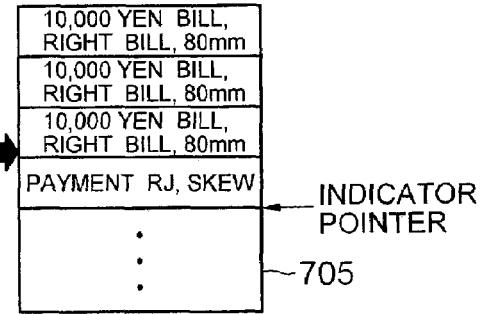
Figure 7C:
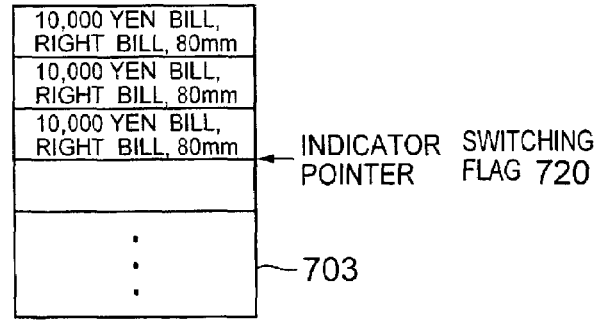
Figure 7F:
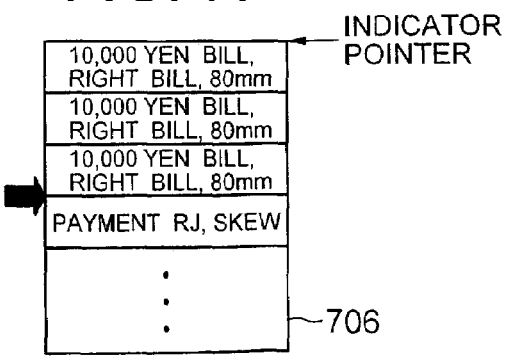

When paying out the bills kept in the temporary storage box, the process updates the indicator point 713 in the opposite direction of storing the bills as 705 of FIG. 7E. When the indicator pointer 713 points the first memory area 711 as 706 of FIG. 7F, the process is completed and it clears the bill information in the memory area 711.

According to the example of FIGS. 7A-7F, there is no need to change the order stored prior to storing the bills kept in the temporary storage box 2. However, according to the example of FIGS. 7A-7F, the process can know the bill which is being stored or paid out at this point, but it is difficult to know whether the bill is stored or paid out at this point, and in this respect the method of FIGS. 3A-3G has an advantage.

Moreover, because it has a switch flag though it is not requisite, if the first bill is payment reject bill, it can be known thereafter that the subsequent bills are payment reject bills until the switch flag is recognized without checking for each bill the distinction result stored in each memory area of the transport sequence memory part as paying out the bills from the temporary storage box 2. Further, it is obvious that in the example of FIGS. 3A-3G if the process has the switching flag between the deposit bill and the payment reject bill the same effect would be obtained about the switching flag.

Further, it is desirable to have the temporary storage box of wind style drum type, but excepting the points clearly described as the special effect of the wind style drum type, the temporary storage box is not restricted to the drum type and it may be any storage box (accepting unit) provided with functions of bringing in and paying out the bills.

Also, a bill deposit and payment machine (bill handling machine) which is provided with a junction between the temporary storage box and the distinction part, namely at the transport path 20, and has a transport path directly connected to the reject storage 4 without passing the distinction part is disclosed for example in JP-A-2001-118111. In this case, the technique to store the true bills put into by the customer and the payment reject bills in the temporary storage box at the payment of change is effective. Namely, when the machine wants to store the payment reject bill that was transported to the distinction part 3 from the transport path 16 and decided to be reject in the reject storage 4 from the junction provided at the transport path 20, it is necessary to switch the transport path switching gate provided at the junction at a high speed because of the short distance between the distinction part and the junction. Then the structure would get complicated and there would be more transport error such as jam. Then by once keeping the payment reject bill in the temporary storage box 2, and according to the paying out from the temporary storage box 2 and the memory in the transport sequence memory part 110 storing the payment reject bill from the junction provided at the transport path 20 to the reject storage without passing the bill through the distinction part, it can provide a bill deposit payment (bill handling) machine with fewer jam and saved space.

And, as it is necessary to switch the junction provided at the transport path 20 according to the case of reject bill and true bill as paying out the bills from the temporary storage box 2, if relatively broad interval is placed between the reject bill and the true bill at they are kept in the temporary storage box 2, this would prevent the error at distributing the bills (deposit bills to payment reject bills or payment reject bills to input bills) and also it can reserve time to switch this junction, and the effect of preventing the difficulties such as jam will be expected.

Additionally, the present invention can be implemented other than the preferred embodiment described above as falling within the scope of the invention.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A currency bill handling machine which handles currency bills, comprising:

a deposit and payment port operable by a user to both deposit and dispense currency bills;

a distinction part to distinguish both the currency bills deposited and those to be dispensed;

storage to store the currency bills; and a temporary storage box to temporarily keep currency bills wherein the temporary storage box temporarily keeps both currency bills decided to be true currency bills by the distinction part among the currency bills input into the deposit and dispensing port and currency bills decided to be reject currency bills by the distinction part bills dispensed from the storage and wherein the currency bills temporarily kept in the temporary storage or project storage box are stored in the storage or project storage after currency bills are deposited by the user.

2. A currency bill handling machine of claim 1, further comprising:

a control part which pays out currency bills from the storage and transports the currency bills to the deposit and dispensing port while currency bills decided to be true bills are temporarily kept in the temporary storage box.

3. A currency bill handling machine of claim 2 wherein the control part temporarily stores currency bills decided to be reject bills in the temporary storage box after temporarily storing currency bills decided to be true bills in the temporary storage box.

4. A currency bill handling machine of claim 1, further comprising:
a reject storage which stores currency bills decided to be reject bills by the distinction part; and
a control part which temporarily stores the reject bills kept in the temporary storage box in the reject storage and stores the true bills temporarily kept in the temporary storage box in the storage according to distinction of the distinction part after the currency bills decided to be true bills by the distinction part among the currency bills, paid out from the storage is carried to the deposit and dispensing port.

5. A currency bill handling machine of claim 1, comprising a control part which pays out currency bills from the temporary storage box in an order opposite to the order of temporarily storing currency bills in the temporary storage box and then stores the currency bills in the storage.

6. A currency bill handling machine of claim 1, further comprising a transport sequence memory part comprising more than one memory area to store currency bill information and stores currency bill information in the memory area in order of temporarily storing currency bills in the temporary storage box.

7. A currency bill handling machine of claim 6, further comprising a control part which sets the order of currency bills stored in the transport sequence memory part opposite as dispensing and transporting currency bills temporarily kept in the temporary storage box to the storage.

8. A currency bill handling machine of claim 6 wherein the transport sequence memory part comprises:
an indicator pointer which updates the more than one memory area to indicate according to currency bill information and payout of the currency bills from the temporary storage box; and
a switching flag which indicates a boundary of the more than one memory area which stores currency bill information of bill true bills by the distinction part among currency bills input at the deposit and payment port and the more than one memory area which stores currency bill information of reject bills by the distinction part among currency bills paid out from the storage.

9. A currency bill handling machine of claim 1, wherein the temporary storage box comprises a drum to wind currency bills on a belt, the drum winds the currency bills with a interval on the belt between the currency bill decided to be true bill at the distinction part and the currency bill decided to be reject bill at the distinction part broader than intervals between the currency bills decided to be true bills at the distinction part.

10. A currency bill handling machine of claim 1, wherein the temporary storage box comprises a box or a drum which temporarily keeps currency bills distinguished by the distinction part before storing the currency bills in the storage.

11. An automated teller machine which performs a deal based on operation of user, comprising:
a user operation part;
a deposit and dispensing port to both deposit and dispense currency bills;
a distinction part which distinguishes both the currency bills deposited and those to be dispensed by a user;
storage for storing currency;
a temporary storage box for temporarily keeping currency bills decided to be true currency bills by the distinction part among currency bills input into the deposit and dispensing port by the user; and
a main control part which dispenses currency bills from the storage with true currency bills previously temporarily kept in the temporary storage box, stores in the storage currency bills rejected by the distinction part among currency bills paid out from the storage box when the amount put into the deposit and dispensing port is greater than the amount input at the user operation part.

12. An automated teller machine of claim 11, wherein the main control part stores currency bills kept in the storage box in the storage after carrying currency bills of balance between the amount decided by the distinction part and the amount input at the user operation part.

13. An automated teller machine of claim 12, further comprising:
a transport sequence memory part which stores information and sequence of currency bills kept in the storage box; wherein
the storage includes a reject storage which stores currency bills rejected at the distinction part, and a currency bill storage which stores currency bills decided to be true bills by the distinction part, and the main control part decides either the reject storage or the currency bill storage as the storage to be used based on the information and sequence stored in the transport sequence memory part.

14. An automated teller machine of claim 11, wherein:
the storage includes a drum which winds a belt which transports currency bills with belt;
the main control part winds currency bills on the drum with a interval on the belt between currency bills decided to be true bills by the distinction part and the currency bills decided to be reject bills by the distinction part broader than intervals between the currency bills decided to be true bills by the distinction part.

15. A method for payment of change performed by an automated teller machine which comprises a user operation part, a deposit and dispensing port to deposit and dispense currency bills, a distinction currency part which distinguishes currency bills, a temporary storage box which keeps currency bills temporarily, and a storage which stores currency bills, comprising the steps of:
sending currency bills from the deposit and dispensing port to the distinction part;
among the currency bills sent from the deposit and dispensing port, temporarily keeping currency bills decided to be true currency bills by the distinction part in the temporary storage box;
receiving input of desired deposit amount at the user operation part;
paying out currency bills from the storage and sending the currency bills to the distinction part when the amount of currency bills decided to be true bills by the distinction part is greater than the input deposit amount;
among the currency bills sent from the storage, temporarily keeping currency bills decided to be reject bills at the distinction part in the temporary storage box; and
paying out currency bills decided to be reject bills and currency bills decided to be true bills temporarily kept in the temporary storage box and storing the paid-out reject bills and true bills in the storage after the step of temporarily keeping currency bills decided to be reject bills in the temporary storage box.

16. A method for payment of change of claim 15, further comprising the steps of:
   storing information and sequence of currency bills to be stored in the temporary storage box in the transport sequence memory part; and
   deciding a storage destination of currency bills based on the information and sequence of the currency bills stored in the transport sequence memory part when temporarily storing the currency bills from the temporary storage box to the storage.

17. A method for payment of change of claim 16, further comprising the steps of:
   updating a store pointer which causes a memory area to store currency bill information next when storing currency bill information in the transport sequence memory part;
   reversing the order in the memory area with the store pointer fixed when there is no currency bills to send to the distinction part from the deposit and dispensing opening;
   updating a process pointer which points the memory area where the bills information on next bills to be paid out is stored when paying out bills from the temporary storage box in the reversed order; and
   deciding whether there is no bills kept in the temporary storage box by the process pointer and the update.

18. A method for payment of change of claim 16, further comprising the steps of:
   updating the process pointer which causes the memory area to store currency bill information next when storing currency bill information in the transport sequence memory part;
   setting a switching flag on between the memory area storing information of currency bills decided to be true bills by the distinction area and the memory area storing information of currency bill decided to be reject bills by the distinction part;
   updating the process pointer which causes the memory area storing information of currency bills to be paid out next when paying out currency bills temporarily stored in the temporary storage box;
   when the process pointer passes between the memory areas with the switching flag on, switching the storage from the reject storage which stores reject bills to the currency bill storage which stores currency bills according to the money kind as the storage to store currency bills to be paid out from the temporary storage box.

19. A method for payment of change of claim 15, further comprising the step of:
   idle-rotating the drum type temporary storage box without winding currency bills when the amount of currency bills decided to be true bills by the distinction part is greater than the payment amount input at the user operation part.

20. A method for payment of change of claim 19, further comprising the steps of:
   detecting the transport interval between the currency bills paid out previously when dispensing currency bills from the drum type temporary storage box;
   setting a stack destination of the currency bills to the reject storage among the storages when the detected transport interval is narrower than a certain interval;
   distinguishing again the currency bills by the distinction part when the detected transport interval is broader than a certain interval;
   setting the stack destination of the currency bills to the currency bill storage according to the money kind among the storages when the second time distinction by the distinction part results to be a right bill; and
   setting the stack destination of the currency bills to the reject storage when the second time distinction by the distinction part results to be not a right bill.

* * * * *

UNITED STATES PATENT AND TRADEMARK OFFICE
CERTIFICATE OF CORRECTION

PATENT NO. : 7,434,725 B2  Page 1 of 1
APPLICATION NO. : 10/452935
DATED : October 14, 2008
INVENTOR(S) : Yukie Taniyama It is certified that error appears in the above-identified patent and that said Letters Patent is hereby corrected as shown below:

On the title Page,

In Item "(73) Assignee", change the name of the Assignee from "Hitachi, Ltd." to --Hitachi-Omron Terminal Solutions Corp.--.

Signed and Sealed this

Tenth Day of November, 2009

David J. Kappos
*Director of the United States Patent and Trademark Office*